United States Patent [19]
Kurita et al.

[11] Patent Number: 5,353,016
[45] Date of Patent: Oct. 4, 1994

[54] REMOTE COMMANDER

[75] Inventors: Tohru Kurita; Toshiyuki Ishii, both of Kanagawa, Japan

[73] Assignee: Sony Corporation, Japan

[21] Appl. No.: 821,449

[22] Filed: Jan. 16, 1992

[30] Foreign Application Priority Data

Jan. 24, 1991 [JP] Japan ................................ 3-022698

[51] Int. Cl.⁵ .............................................. H04Q 1/00
[52] U.S. Cl. .................. 340/825.22; 341/23; 341/176; 348/734
[58] Field of Search ...................... 340/825.22, 825.72; 341/23, 176; 358/194.1

[56] References Cited
U.S. PATENT DOCUMENTS

| | | | |
|---|---|---|---|
| 4,348,660 | 9/1982 | Robertsen | 341/23 |
| 4,878,055 | 10/1989 | Kasahara | 341/23 |
| 4,890,832 | 1/1990 | Komaki | 341/23 |
| 4,973,960 | 11/1990 | Mount | 341/23 |
| 5,038,401 | 8/1991 | Inotsume | 341/23 |

FOREIGN PATENT DOCUMENTS

0043224 3/1982 Japan ................................ 341/23

*Primary Examiner*—Sandra L. O'Shea
*Assistant Examiner*—Brian Zimmerman
*Attorney, Agent, or Firm*—Ronald P. Kananen

[57] ABSTRACT

The present invention relates to a remote commander for remote-controlling a video device, audio device, etc., and can send various control data corresponding the operating cards according to demand, by providing an operating card receiving space below transparent and plate like coordinates input means and sending the control data determined by a coordinates detection result of the coordinates input means according to an identification result of the operating card received in the operating card receiving space by exchanging the operating card. Therefore, it is possible to, for example, set an operating card every control object and easily remote-control various control objects.

8 Claims, 6 Drawing Sheets

REMOTE COMMANDER

BACKGROUND OF THE INVENTION

The present invention relates to a remote commander and is applicable to the remote control of video devices and audio devices.

Conventionally, in a video device such as a television receiver, there is the capability of being remote controlled by using a remote commander.

In the remote commander of this kind, rather than sending a predetermined remote control signal to a control object in response to the operation of an operation member, the remote control signal is received by the control object to thereby more easily switch the operation of a desired control object.

On the other hand, it is possible to connect various video-audio devices such as video tape recorders to a television receiver. In such a case, it is more convenient if the various control objects can be controlled by a single remote commander.

In this case, there is a method of arranging preliminarily on the remote commander operating members corresponding to various control objects and selectively operating them according to the control objects. However, in such case, there is a problem in that the versatility of the remote commander is limited.

As a method for solving this problem, an openable cover may be provided on the remote commander with operating members of different control objects arranged on an upper surface and an interior of the cover. According to this method, it is possible to group and arrange the operating members with every control object thereby improving the versatility of the remote commander.

In such case, however, the problem remains that it is impossible to remote control objects other than those preliminarily grouped, thus greater versatility of the remote commander is limited.

SUMMARY OF THE INVENTION

In view of the foregoing, an object of the present invention is to provide a remote commander capable of easily remotely controlling various control objects.

The foregoing object and other objects of the invention have been achieved by the use of a remote commander which comprises coordinate input means 10 in the form of a substantially transparent plate, an operating card receiving space 14 provided on a lower side of said coordinates input means 10, an operating card identification mechanism 20A-20E for identifying an operating card 16, 18, 30 received in said operating card receiving space 14, and control data sending means 22, 26, 28 for sending control data corresponding to a result of identification of said operating card identification mechanism 20A-20E on the basis of a coordinates detection result of said coordinates input means 10.

By sending control data in response to the identification result of the operating card identification mechanism 20A-20E on the basis of the coordinates detection result of the coordinates input means 10, it is possible to switch control data correspondingly to the operating cards 16, 18, 30 and it is possible to easily remotely control various control objects by merely replacing the said operating cards 16, 18, 30 as needed.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
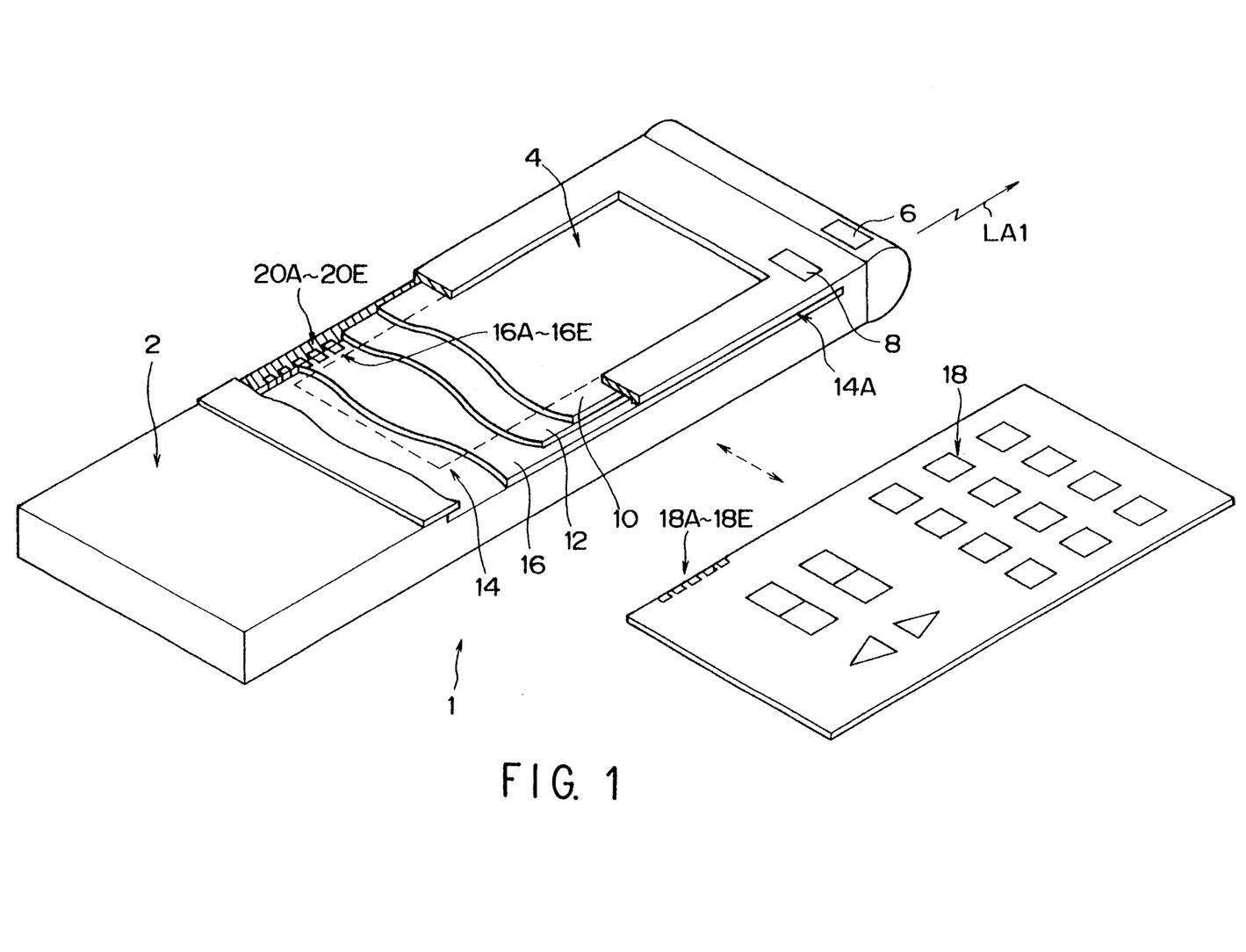
FIG. 1 is a perspective view of a remote commander according to an embodiment of the present invention.

Preferred embodiments of the present invention will be described with reference to the accompanying drawings:

FIG. 1 shows a remote commander 1, which remotely controls a predetermined control object through infrared ray LA1 transmitted from a light emitting portion. The remote commander 1 has a battery receiving space 2 for receiving a dry battery formed with a rectangular shaped operating portion 4.

Further, the remote commander 1 has a power source operating member 6 and a timer set operating member 8 having top end portions juxtaposed on a right side. A power source of the control object (in this case, composed of a video tape recorder) is on-off controlled in response to operation of the power source operating member 6.

The remote commander further includes an operating portion 4 with a transparent touch panel 10 arranged on its upper surface, by which it is possible to detect a user-depressed position. Further, a liquid crystal display portion 12 is arranged under a lower surface of the touch panel 10, so that it is possible to visually confirm a display screen of the liquid crystal display portion 12 through the touch panel 10.

On a lower side of the crystal display portion 12, a card receiving space 14 is provided into which an operating card 16 or 18 can be inserted through a rectangular shaped inserting opening 14A formed in a side face of the remote commander 1.

Here, the operating card 16 or a television receiver operating card 18, are prepared so as to correspond to control objects of the remote commander 1. On upper surfaces of each of the operating cards 16 and 18, shapes of the various video tape recorder and television receiver operating members are printed.

Accordingly, the remote commander 1 can remotely control a desired video tape recorder or a television receiver by depressing a position of the operating member printed on the operating card 16 or 18 through the touch panel 10 after the operating card 16 or 18 is inserted into the card receiving space 14 as needed.

Figure 2:
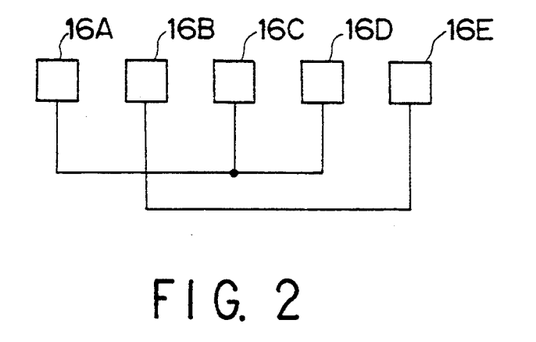
FIG. 2 is a wiring diagram showing a connection of a video tape recorder operating card.
Figure 3:
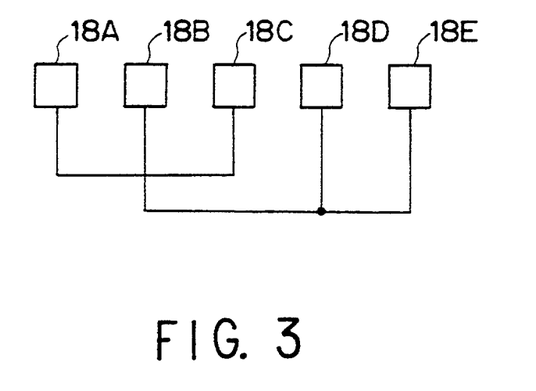
FIG. 3 is a wiring diagram showing a connection of a television receiver operating card.

FIGS. 2 and 3 illustrate five electrodes 16A–16E and 18A–18E which are formed on side surfaces of the operating cards 16 and 18. In the video tape recorder operating card 16, the electrodes 16A, 16C and 16D and the electrodes 16B and 16E are respectively connected internally, as shown in FIG. 2, while in the television receiver operating card 18, the electrodes 18A and 18C and the electrodes 18B, 18D and 18E are connected internally, as shown in FIG. 3.

Correspondingly, in an interior of the card receiving space 14, five electrodes 20A–20E (FIG. 1) are formed such that they can contact with the respective electrodes 16A–16E and 18A–18E. The electrodes 20A and 20B are connected to a power source line and a grounding line, respectively.

Therefore, when the video tape recorder operating card 16 is inserted, the electrodes 20C and 20D are held at a HIGH logic level and electrode 20 is held at a LOW logic level. When the television receiver operating card 18 is inserted electrode 20C is held HIGH and electrodes 20D and 20E are held LOW. In this way, it is possible to identify which operating card, 16 or 18, is inserted according to the signal level of the electrodes 20C, 20D and 20E.

Electrodes 20C, 20D and 20E are connected to a printed circuit board. The printed circuit board is held in a printed board receiving space in a lower portion of the card receiving space 14. A drive circuit of the remote commander 1 is formed on the said printed circuit board.

Figure 4:
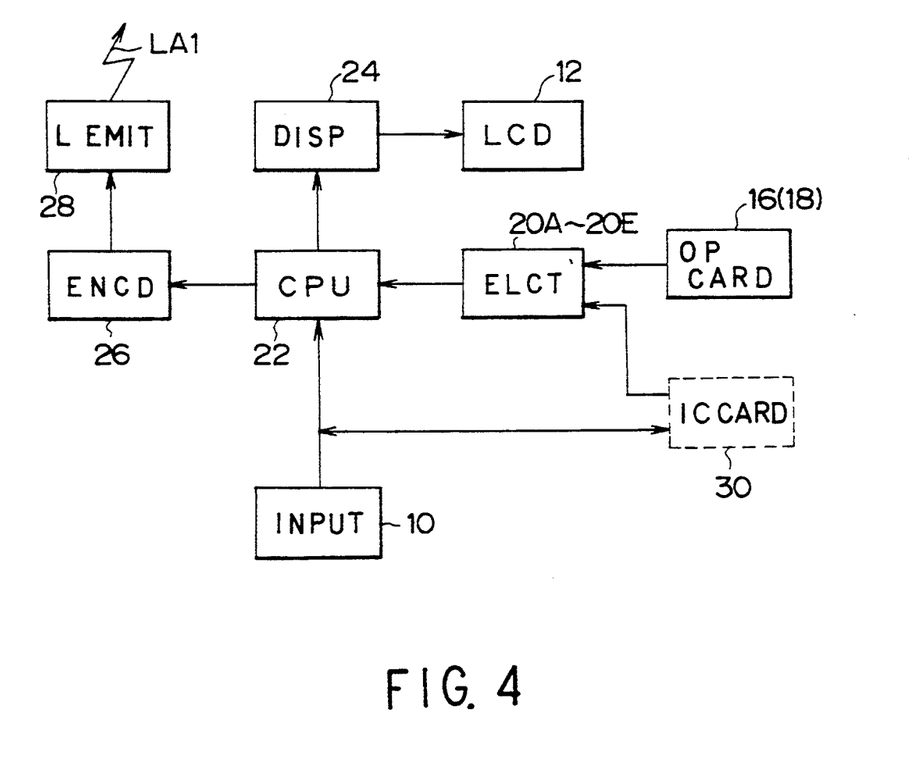
FIG. 4 is a block diagram showing a remote commander.

As shown in FIG. 4, the drive circuit of the remote commander 1 includes a central processing unit (CPU) 22 which drives a display circuit 24, causing the liquid crystal display portion (LCD) 12 to display an image of a basic mode when it detects that neither of the operating cards 16 or 18 is inserted into the card receiving space 14 on the basis of the signal levels of the electrodes 20C, 20D and 20E. Here, the basic mode is a mode in which a basic operating member for operating the video tape recorder is displayed. The CPU 22 drives the liquid crystal display portion 12 to display operating members such as reproduction, fast feeding, rewinding, etc.

In the basic mode, the CPU 22 detects a pressed position of an input portion 10 composed of the touch panel. For example, when the CPU 22 detects the reproduction operating member, it drives a light emitting portion 28 through an encoder 26 to thereby send a reproduction command to the video tape recorder.

By this arrangement, the CPU 22 can switch the basic operation of the video tape recorder by sending a command corresponding to the operating member of the basic mode when neither of the operating cards 16 and 18 is inserted.

Further, in this case, the CPU 22 switches the display of the liquid crystal display portion 12 according to the command sent. For example, after the display is switched to an operating member operated in the reproduction mode (composed of operating members for, for example, stop, temporary stop, frame feed, variable speed reproduction), the CPU sends a command of the operating member according to the operation of a user.

With the described remote commander 1, it is possible to reduce operation errors and to improve the versatility of remote control.

In another mode, when the video tape recorder operating card 16 is inserted, the CPU 22 detects the video tape recorder operating card 16 on the basis of the change of signal levels of the electrodes 20C, 20D and 20E, and switch to a timer reservation mode. In this mode, the CPU 22 drives the display circuit 24 to switch the display of the liquid crystal display portion 12 to transparent so that it is possible to visually confirm the print of the video tape recorder operating card 16 through the touch panel 10 and the liquid crystal display portion 12.

In this state, the CPU 22 detects the depressed position of the input portion 10, and when a display position of an operating member is depressed, such as hour, minute, channel, etc., of timer reservation, sends corresponding commands sequentially. In this way, the remote commander 1 can easily perform the timer reservation by operation a desired operating member after the operating card 16 is inserted.

On the other hand, when the television receiver operating card 18 is inserted, the CPU 22 detects the television receiver operating card 18 by the signal levels of the electrodes 20C, 20D and 20E and it switches to the television receiver operating mode. Here, the CPU 22 switches the display of the liquid crystal display portion 12 in a similar manner to the case of the timer reservation so that the print of the television receiver operating card 18 can be confirmed visually through the touch panels 10 and the liquid crystal display portion 12. In this state, the CPU 22 detects a depressed position of the input portion 10 and, when various positions such as channel, volume, etc., are depressed, it sends corresponding commands sequentially.

Thus, by simply inserting the operating card 16 and 18, it is possible to switch between the video tape recorder and the television receiver by remote control to thereby improve the versatility of the remote commander 1.

In another embodiment, an IC card 30 may be inserted instead of the operating card 16 and 18. Again, the CPU 22 detects the IC card 30 through the electrodes 20C, 20D and 20E and switches the display of the liquid crystal display portion 12 to transparent. In this exempt, the remote commander 1 has a plurality of electrodes in an end of the card receiving portion 14, and the electrodes are connected to a bus line of the CPU 22. Accordingly, the CPU 22 accesses the IC card 30 based on a depressed position of the input portion 10 when it is depressed while the IC card 30 inserted, and the CPU 22 sends a stored command to the IC card 30. As a result, it is possible to remote-control various video devices and audio devices corresponding to the IC card by selectively inserting the IC card according to demand and to more easily remote control various control objects.

Thus, the electrodes 20C, 20D and 20E form, together with the electrodes 20A and 20B, a card identification mechanism for identifying the operating cards 16 or 18, and the IC card 30.

In the arrangement described above, when a video tape recorder is operated in the basic mode, the operating card 16 or 18 and the IC card 30 is drawn from the remote commander 1. By this arrangement, the absence of either of the operating cards, 16 or 18, from the card receiving space 14 is detected by the CPU 22 on the basis of the signal levels of the electrodes 20C, 20D and 20E. Consequently, display of the liquid crystal display portion 12 is switched to the display image of the basic mode. In this state, when the user depress an operating member of the display screen through the touch panel 10, a command corresponding to the selected operating member is sent and it is possible to switch the operation of the video tape recorder.

On the other hand, in the timer reservation mode, the video tape recorder operating card 16 is inserted into the card receiving space 14. The operating card 16 is then detected by the CPU 22 on the basis of the signal levels of the electrodes 20C, 20D and 20E and the display of the liquid crystal display portion 12 is switched to transparent. Thus, it is possible to visually confirm the print of the video tape recorder operating card 16 through the touch panel 10, the liquid crystal display portion 12. When the user depresses the operating member of the print through the touch panel 10 in this state, a command corresponding to the said operating member is sent. It is then possible to perform the timer reservation of the video tape recorder.

In order to control the operation of the television receiver, the television receiver operating card 18 is inserted into the card receiving space 14. Accordingly, the television receiver operating card 18 is detected by the CPU 22 on the basis of the signal levels of the electrodes 20C, 20D and 20E and the display of the liquid crystal display portion 12 is switched to transparent. It is then possible to visually confirm the print of the television receiver operating card 18 through panel 10 and the liquid crystal display portion 12. When the user depresses the operation member of the print through the touch panel 10 in this state, a command corresponding to the said operating member is sent and thus the operation of the television receiver can be switched.

Further, when it is desired to switch the operation of a video-audio device other than a video tape recorder or a television receiver, the IC card 30 corresponding to such a video-audio device is inserted. Consequently, the IC card 30 is detected by the CPU 22 on the basis of the signal levels of the electrodes 20C, 20D and 20E and the display of the liquid crystal display portion 12 is switched to transparent. It is then possible to visually confirm the print of the IC card 30 through the touch panel 10 and the liquid crystal display portion 12.

When the user depresses the operating member of the said print through the touch panel 10 in this state, the IC card 30 is accessed according to the operation position and the commands stored in the said IC card 30 are sent sequentially. It is then possible to switch the operation of the video-audio device. According to the construction mentioned above, it is possible to easily remote-control a desired video, audio device by inserting selectively the said operating card by sending a command corresponding to the operating card arranged below the touch panel.

Figure 5:
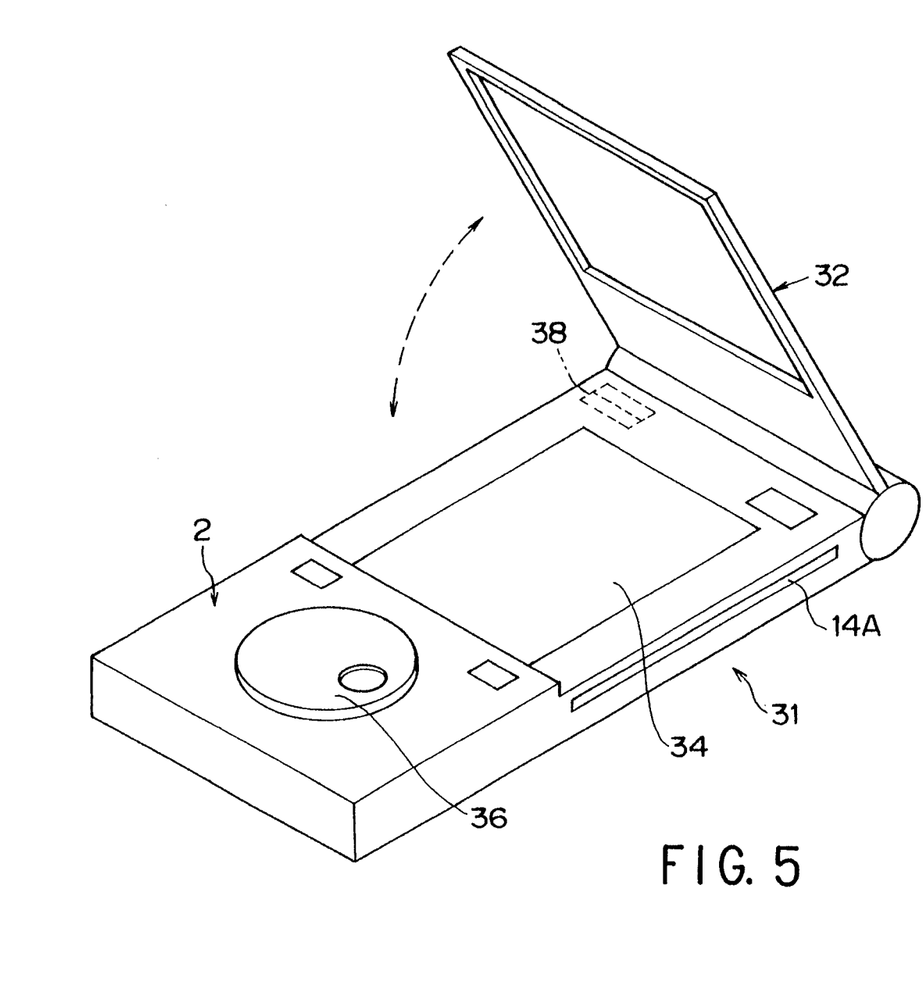
FIG. 5 is a perspective view showing a remote commander having openable cover.

Although, in the above described embodiment, the case where the operating portion is merely arranged on the upper surface of the remote commander has been described, the present invention is not limited to this arrangement. It is possible to arrange a cover 32 on an upper surface of a remote commander 31 and provide an operating portion 34 on the lower side of the cover 32, such as shown in FIG. 5.

Figure 6:
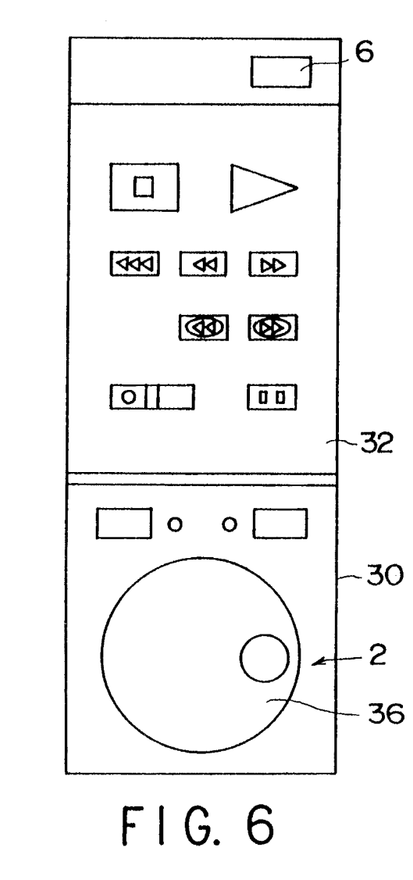
FIG. 6 is a plane view showing the cover closed.

In this case, by arranging a basic operating member of a video tape recorder on the cover 32 and setting a mode such that a timer reservation can be performed by opening the cover 32 without inserting the operating card, as shown in FIG. 6, it is possible to remote control the video tape recorder by merely opening and closing the cover 32. In addition to this, it is possible to remotely control the television receiver, etc., by inserting an operating card.

In this case, a jog dial 36 is arranged on an upper surface of a battery receiving portion 2 so that a reproduction speed can be remote controlled. Further, it is possible to provide an operating portion on the side of the cover 32 and arrange a predetermined operating member on the lower side of the cover 32. In this case, it is enough to form a connection portion 38 for driving the touch panel and the liquid crystal display portion on a root portion of the cover 32.

Figure 7:
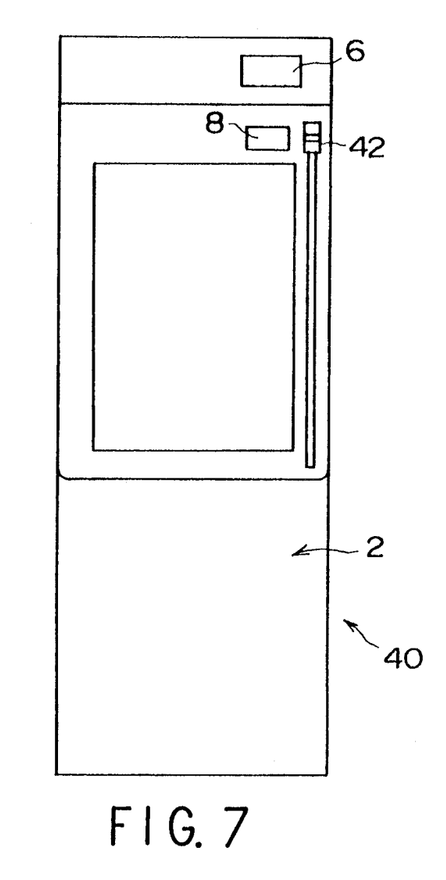
FIG. 7 is a plane view showing a remote commander having an operating card received therein.

Although, in the above described embodiment, the case where the operating card is inserted has been described, the present invention is not limited to this embodiment. It is possible to receive the operating card in an interior of a remote commander 40 and insert the operating card to a predetermined receiving position by sliding a predetermined operating member 42, as shown in FIG. 7. By doing so, it is possible to simplify an exchange of operating cards.

Figure 8:
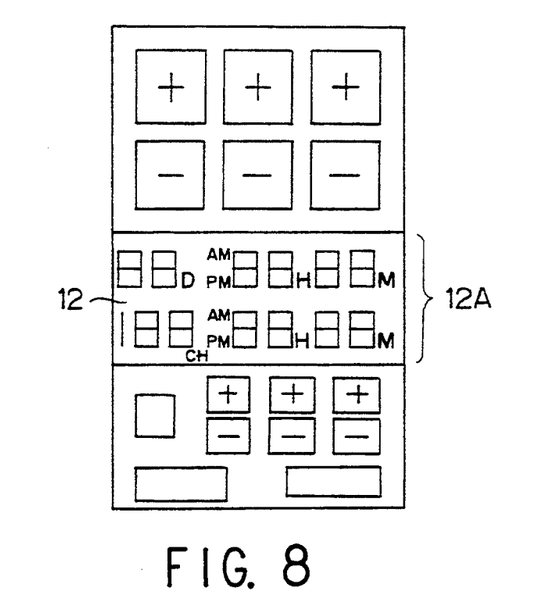
FIG. 8 is a plane view showing another embodiment of a liquid crystal display portion.

Further, although, in the above described embodiment, the case where the liquid crystal display portions switched to transparent for timer reservation has been described, the present invention is not limited to this, it is possible to switch only a portion to transparent and to display a timer reservation information in the remaining portion 12A, as shown in FIG. 8.

Further, although, in the above described embodiment, the case where the liquid crystal display portion is arranged in a lower portion of the touch panel has been described, the present invention is not limited to this, it is possible to eliminate the liquid crystal display portion. By doing so, it is possible to simplify the construction of the remote commander.

Further, although, in the above described embodiment, the case where the operating position is detected by using the touch panel has been described, the present invention is not limited to this, it is possible to apply various coordinates input means.

Further, although, in the above described embodiment, the case where the video tape recorder operating card and the television receiver operating card are exchanged has been described, the present invention is not limited to this, it is possible to use a single card for the video tape recorder and the television receiver operating by using two portions of the card.

Figure 9:
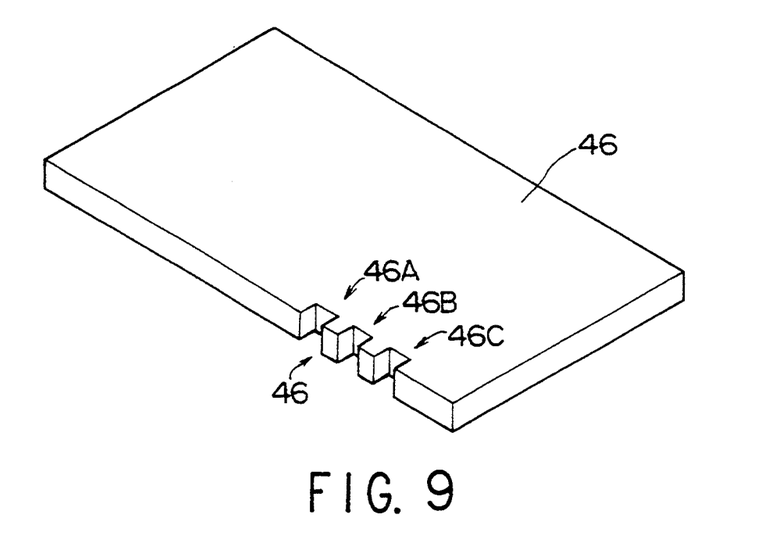
FIG. 9 is a perspective view showing another embodiment of the operating card.

Further, although, in the above described embodiment, the case where the operating card is identified by using the electrodes 16A–16E, 18A–18E and 20A–20E has been described, the present invention is not limited to this, it is possible to apply various identifying means. In this case, it is possible to form notches 46A–46C in side faces, etc., of an operating card 46 for identification using the said notches 46A–46C, as shown in FIG. 9.

As described, according to the present invention, it is possible to obtain a remote commander capable of easily remote-controlling various control objects corresponding to operating cards by providing an operating card receiving portion below coordinates input means and exchanging the said operating card by sending control data corresponding to the said operating cards received in the operating card receiving portion based on a coordinate detection result of the coordinates input means.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A remote commander for controlling the operation of one or more devices comprising:

coordinates input means including a transparent plate for selecting one or more of a plurality of operating members located on an operating portion of the remote commander, said coordinates input means providing output control signals in response to operation of said operating members;

an operating card receiving space provided under a side of said coordinates input means;

operating card identification means for identifying an operating card which cooperates with said operating card receiving space, said operating card identification means providing control signals in response to the cooperation between said operating card and said operating card receiving space; and control data sending means for sending control data selectable according to control signals provided by said operating card identification means and said coordinates input means; and further comprising a cover arranged over said coordinates input means, said cover having a basic operating control on an upper surface for controlling devices other than devices controlled by said coordinates input means.

2. The remote commander according to claim 1, wherein various operations of a device controlled by the remote commander are controlled by operating a corresponding operating member; and wherein printed symbols indicating the operations of said device are printed on an upper surface of said operating card such that when said operating card is placed within said operating card receiving space, said printed symbols are associated with the operating member which controls a corresponding operation of said device.

3. The remote commander according to claim 1, further comprising a liquid crystal display arranged adjacent to a side of said transparent plate, said liquid crystal display providing a preselected basic mode image when there is no card inserted into said operating card receiving space and providing a transparent surface when an operating card is inserted into with said operating card receiving space.

4. The remote commander according to claim 1, further comprising one or more operating cards arranged in an interior of said remote commander, said operating cards being inserted to a predetermined receiving position by sliding an operating control arranged on the surface of said remote commander.

5. The remote commander according to claim 3, wherein a portion of said liquid crystal display is transparent and the remaining portion displays data corresponding to the operation of the remote commander.

6. The remote commander according to claim 1, wherein said operating card is used to control two devices by using two portions of said operating card.

7. The remote commander according to claim 1, wherein said operating card identification means comprises:

a plurality of identifying notches located on said operating card; and detections means located on said remote commander for detecting said identifying notches, whereby a logic circuit is provided when said operating card is inserted into said operating card receiving space, said logic circuit providing electrical identification control signals which indicate the type of operating card inserted.

8. A remote commander for controlling the operation of one or more devices comprising:

coordinates input means including a transparent plate for selecting one or more of a plurality of operating members located on an operating portion of the remote commander, said coordinates input means providing output control signals in response to operation of said operating members;

an operating card receiving space provided under a side of said coordinates input means;

operating card identification means for identifying an operating card placed within said operating card receiving space, and for providing electrical identification control signals in response to said identifying of said operating card; and control data sending means for sending control data to said one or more devices which is selectable according to said electrical identification control signals provided by said operating card identification means and said output control signals provided by said coordinates input means;

wherein said operating card identification means comprises:

a plurality of electrodes attached to said remote commander; and a plurality of electrodes attached to said operating card;

whereby a logic circuit is provided when said operating card is inserted into said operating card receiving space, said logic circuit providing electrical identification control signals which indicate the type of operating card inserted.

* * * * *